United States Patent [19]

Miyadera

[11] Patent Number: 5,606,716
[45] Date of Patent: Feb. 25, 1997

[54] DEVICE FOR DETECTING THE CONNECTIVITY OF A MONITOR AND INHIBITING A DATA REPRODUCING OPERATION

[75] Inventor: Shunichi Miyadera, Tokyo, Japan

[73] Assignee: Asahi Kogaku Kogyo Kabushiki Kaisha, Tokyo, Japan

[21] Appl. No.: 892,500

[22] Filed: Jun. 3, 1992

Related U.S. Application Data

[63] Continuation of Ser. No. 599,082, Oct. 17, 1990, abandoned.

[30] Foreign Application Priority Data

Oct. 18, 1989  [JP]  Japan ..................... 1-272036

[51] Int. Cl.⁶ ................................... G06F 11/00
[52] U.S. Cl. .................. 395/837; 395/309; 395/825; 395/806; 345/3
[58] Field of Search .................... 364/200, 900; 395/821, 837, 835, 836, 838, 839, 154, 309, 825; 345/3

[56] References Cited

U.S. PATENT DOCUMENTS

| | | | |
|---|---|---|---|
| 3,696,338 | 10/1972 | Preiss | 364/900 |
| 3,716,834 | 2/1973 | Adams | 371/20.4 |
| 3,810,120 | 5/1974 | Huettner | 364/900 |
| 4,125,870 | 11/1978 | Suzuki et al. | 364/900 |
| 4,258,418 | 3/1981 | Heath | 364/200 |
| 4,309,755 | 1/1982 | Lanty | 364/200 |
| 4,312,035 | 1/1982 | Greene | 364/200 |
| 4,327,408 | 4/1982 | Frissell et al. | 364/200 |
| 4,486,826 | 12/1984 | Wolff et al. | 364/200 |
| 4,644,348 | 2/1987 | Gerety | 340/825.06 |
| 4,741,021 | 4/1988 | Kotani et al. | 379/100 |
| 4,792,898 | 12/1988 | McCarthy et al. | 364/200 |
| 4,794,525 | 12/1988 | Pickert et al. | 364/200 |
| 4,837,637 | 6/1989 | Akiyama et al. | 358/342 |
| 4,899,291 | 2/1990 | Tsukada et al. | 364/518 |
| 4,987,586 | 1/1991 | Gross et al. | 379/93 |
| 4,991,121 | 2/1991 | Minoura et al. | 364/521 |
| 4,994,913 | 2/1991 | Maeshima | 358/142 |
| 5,159,683 | 10/1992 | Lvovsky et al. | 395/500 |

*Primary Examiner*—Christopher B. Shin
*Attorney, Agent, or Firm*—Greenblum & Bernstein P.L.C.

[57] ABSTRACT

A data regenerating device includes a connecting device for connecting the data regenerating device to an external device. The data regeneration device regenerates data which has been stored in a predetermined recording medium arranged to be adapted to the data regenerating device in a predetermined manner via the external device. The data regenerating device comprises a judging component for judging whether the external device is able to receive the data to be regenerated and an inhibiting component for inhibiting a predetermined data processing for the data regenerating operation when it is judged by the judging component that the external device is not able to receive the data. Therefore, it becomes possible to prevent electrical power required for operating the data regenerating device from being undesirably spent and also prevent a regenerating head provided within the data regenerating device and the video floppy disk from being undesirably worn away.

22 Claims, 5 Drawing Sheets

DEVICE FOR DETECTING THE CONNECTIVITY OF A MONITOR AND INHIBITING A DATA REPRODUCING OPERATION

This application is a continuation, of application Ser. No. 07/599,082, filed Oct. 17, 1990, now abandoned.

BACKGROUND OF THE INVENTION

This invention relates to a data reproducing device, having an output terminal through which image signals are outputted, such as a video floppy disk reproducing device. This invention relates more particularly to a data regenerating device capable of judging whether a monitor device for reproducing the stored data, such as a CRT (Cathode Ray Tube) unit, is operable or not, and inhibiting reproducing operation in case that it is judged that the monitor device is not operable.

Conventionally, a data reproducing device capable of being connected to a monitor device such as a CRT unit has been known. In this type of data reproducing device, data stored in a recording medium, such as a video floppy disk, is reproduced as a visible image on the CRT unit. The visible image might have been taken by a still video camera for example, and the electrical data corresponding to the visible image is typically stored in the video floppy disk. In other words, the video floppy disk is arranged to be electrically connected to the data reproducing device, and the data in the video floppy disk is reproduced as the visible image.

In this conventional data reproducing device, however, the video floppy disk is operated to reproduce the data even when the monitor device is not operable for reproducing the data, e.g., a power supply is not connected to the monitor device, an operation mode of the monitor device is not for reproducing the data stored in the video floppy disk, or the monitor device is detached from the data reproducing device. Accordingly, if the reproducing operation is executed during the above non-operable states of the monitor device, the below-described disadvantage is encountered, i.e., electrical power required for operating the data reproducing device is undesirably spent, and a reproducing head provided within the data reproducing device as well as the video floppy disk are subject to unnecessary wear.

SUMMARY OF THE INVENTION

It is therefore an object of the invention to provide an improved data reproducing device arranged to be operable only when an external device such as a monitor device for reproducing the data is operable.

For this purpose, according to the present invention, there is provided a data reproducing device, including connecting terminals for connecting the data reproducing device to an external device, for reproducing data stored in a predetermined recording medium which is adapted to the data reproducing device in a predetermined manner on the external device. The data reproducing device comprises:

judging means for judging whether the external device is able to receive the data to be reproduced; and inhibiting means for inhibiting a predetermined data processing for the data reproducing operation in case that it is judged by the judging means that the external device is not able to receive the data.

DESCRIPTION OF THE ACCOMPANYING DRAWINGS

DESCRIPTION OF THE EMBODIMENTS

Figure 1A:
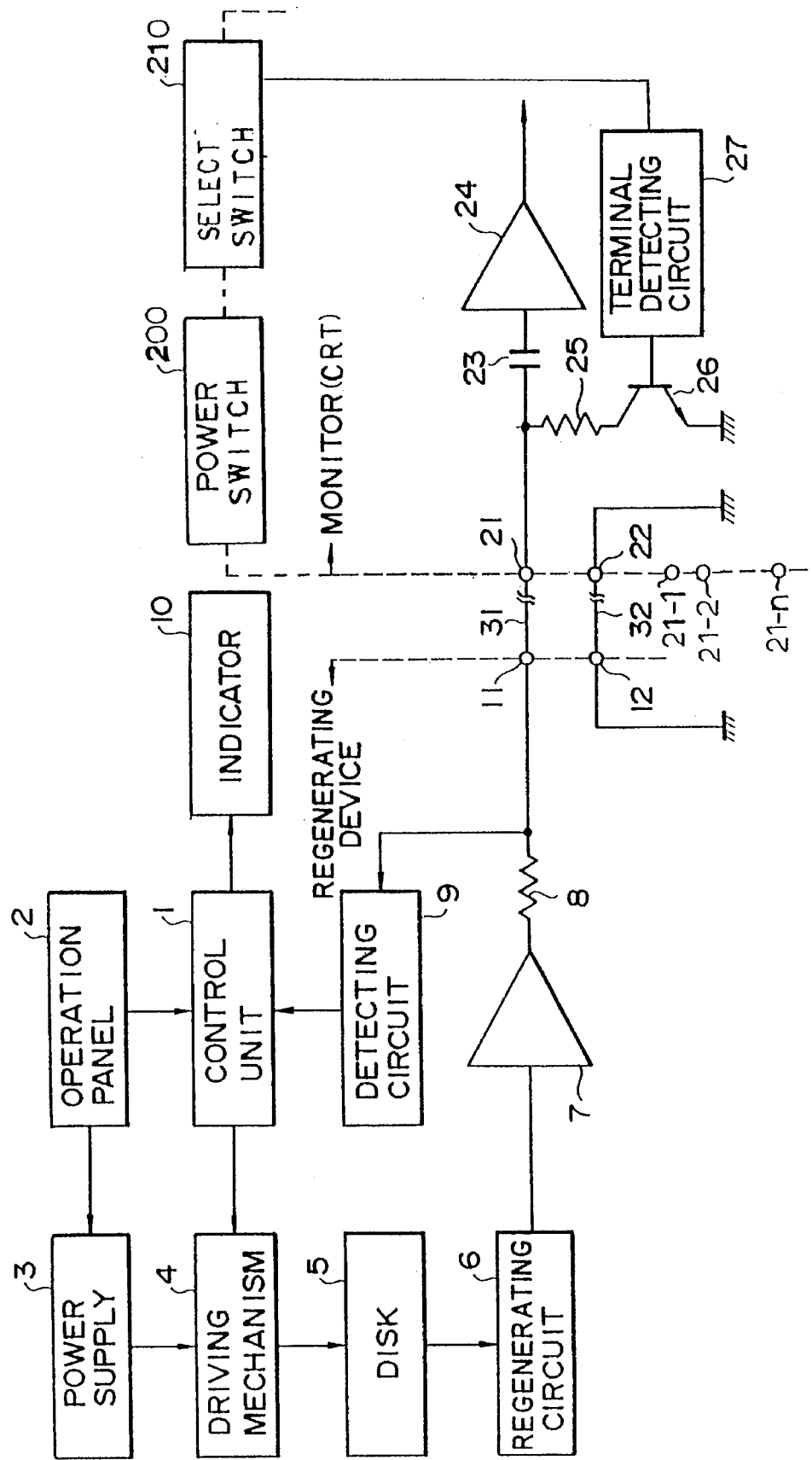
FIG. 1A shows a block diagram showing one embodiment of a data reproducing device according to the present invention.

FIG. 1A shows a block diagram of one embodiment of a data reproducing device according to the present invention. In this drawing, numeral 1 indicates a control unit including a processing device such as a micro computer for controlling each of the elements provided in the data reproducing device in accordance with operations of a plurality of buttons, switches and so forth provided on an operation panel 2. Numeral 3 indicates a power supply for supplying electrical power to each of the elements. Numeral 4 indicates a driving mechanism for driving a video floppy disk 5 as a recording medium to be rotated when a data reading operation is executed. Numeral 6 indicates a reproducing circuit for reproducing the data having stored in the video floppy disk 5.

The reproducing circuit 6 is arranged to receive the data stored in the video floppy disk 5 and to transmit the data to an amplifier circuit 7. The data from the video floppy disk 5 is transmitted to an output terminal 11 through a resistor 8 for adjusting impedance matching between an output side of the amplifier circuit 7 and the output terminal 11. Numeral 12 is a ground terminal of the data reproducing device. Numeral 9 indicates a detecting circuit for detecting a state of a monitor device such as a CRT unit, described later, connected to the data reproducing device and judging whether the monitor device is operable for reproducing the data. Numeral 10 indicates an indicator for indicating the states of the data reproducing device.

The monitor device such as a CRT unit is arranged to be detachably connected to the above structured data reproducing device through a pair of communication lines 31, 32. The output terminals 11, 12 of the data reproducing device are respectively connected to a pair of input terminals 21, 22 of the monitor device through the lines 31, 32. Numeral 22 is a grounded terminal of the monitor device. The input terminal 21 is connected to an amplifier 24 through a condenser (capacitor) 23 and further connected to an NPN type transistor 26 through a resistor 25 for adjusting the amount of current flow through the transistor 26 and adjusting impedance matching between the terminals 11 and 12.

In the above-mentioned monitor device, a plurality of input terminals 21-1, 21-2, . . . 21-n in addition to the input terminal 21 are provided, and one of the desired input terminal is selected by operating a predetermined select switch 210 provided on the monitor device. Then, the selected input terminal becomes operable. Numeral 27 indicates a terminal detecting circuit for detecting whether the input terminal 21 is selected, and outputting a signal in accordance with the detection. For example, in this embodiment, high "H" level D.C. voltage is output when the input terminal 21 is selected, and a low "L" level is output when the terminal 21 is not selected. Further, the amplifier 24 is arranged to be operable only when the input terminal 21 is selected.

Referring to the block diagram shown in FIG. 1A and a flow chart shown in FIG. 2, an operation of the data reproducing device including the monitor device will now be described.

First, as described above, the pair of output terminals 11, 12 of the data reproducing device are connected to the pair of input terminals 21, 22 of the monitor device through the connection lines 31, 32. If a power switch 200 of the monitor device is turned on and the input terminal 21 is selected by the predetermined select switch 210, i.e., the data stored in the video floppy disk 5 can be transmitted from the data reproducing device to the monitor device. Further the "H" level in output from the terminal detection circuit 27; as described above, and then, the transistor 26 is turned on and the input terminal 21 is grounded through the resistor 25 and the ON-operated transistor 26.

On the other hand, in the data reproducing device, when a power switch, not shown, provided on the operation panel 2 is turned on, electrical power is supplied to each of elements by means of the power supply 3. Further, by operating a reproducing switch, not shown, provided on the operation panel 2, the control unit 1 controls initiates operation of the driving mechanism 4, and the video floppy disk 5 is driven to be rotated by means of the driving mechanism 4. The reproducing circuit 6 reads out data from the rotating video floppy disk 5, and transmits the data to the amplifier circuit 7. The data is further transmitted from the amplifier circuit 7 and received by the monitor device through the input terminal 21. The received data passes through the amplifier 24 and is represented on a screen, not shown, as a visible image.

If the monitor device is in one of the below-described state, it becomes impossible to represent the image on the screen. These states exist if, for example, the monitor device is detached from the data reproducing device, the power switch of the monitor device 200 is not turned on even if the devices are connected with each other, the input terminal 21 is not selected, and so forth.

Figure 2:
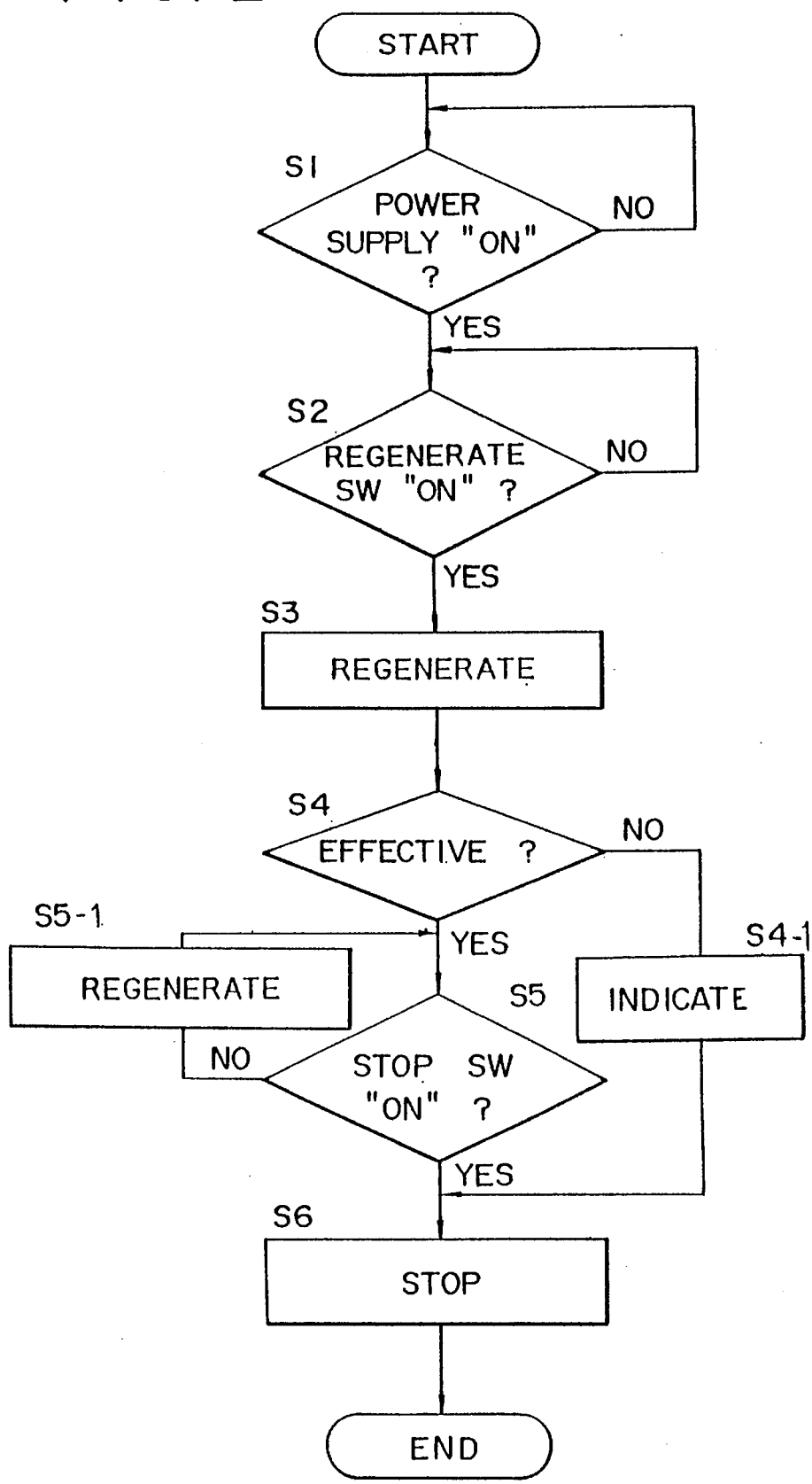
FIG. 2 shows a flow chart showing an operation of the data reproducing device shown in FIG. 1A.

In the data reproducing device according to the present invention, the control unit 1 executes a processing described in the flow chart shown in FIG. 2. First, in step S1, it is determined whether the power switch thereof is turned on or not. Further, it is determined whether the reproducing switch is turned on or not in step S2. When the above two switches are respectively turned on, a data reproducing operation, i.e., a driving operation of the video floppy disk 5 and a reproducing operation of the data stored in the video floppy disk 5, is executed in step S3. Further, in step S4, it is judged whether the monitor device is effectively connected to the data reproducing device or not. In other words, it is judged, in this embodiment, whether the monitor device is connected to the data reproducing device and the monitor device is in a state in which the data can be reproduced on the screen of the monitor device. The hudgement operation executed in step S4 will now be described.

First, when the monitor device is detached from the data reproducing device, the input terminal 21 is in an open state. Further, when the input terminal 21 is not selected, the "L" (LOW) level voltage is supplied to the base of the transistor 26 from the terminal detecting circuit 27 and the transistor 26 is turned OFF. Accordingly, the amplitude of the output signal from the output terminal 11 toward the input terminal, when under the condition that the monitor device is not connected to the data reproducing device, becomes substantially similar to the case when the input terminal 21 is not selected, since the amplifier 24 is not operable when the terminal 21 is not selected.

On the contrary, when the input terminal 21 is selected, the devices are accurately connected with each other and the power switches of these devises are turned on, the transistor 26 is turned ON, and then, a communication line of the signal, i.e., from the input terminal 21 to the condenser 23, is grounded through the resistor 25 and the transistor 26. Accordingly, the amplitude of the output signal (voltage) from the output terminal 11 is attenuated as compared with the case in which the transistor 26 is not ON-operated. In other words, the amplitude of the output signal (voltage) from the output terminal 11 is changed in accordance with a state of the communication line. The amplitude of the output signal (voltage) is attenuated only when the devices are operably connected. The detecting circuit 9 detects the change of the amplitude of the output signal at the output terminal 11, and outputs a signal in accordance with the detection. For example, the vertical synchronous signal included in the data output from the reproducing circuit 6 can be utilized as the above output signal whose amplitude is to be detected by the detecting circuit 9.

Figure 1B:
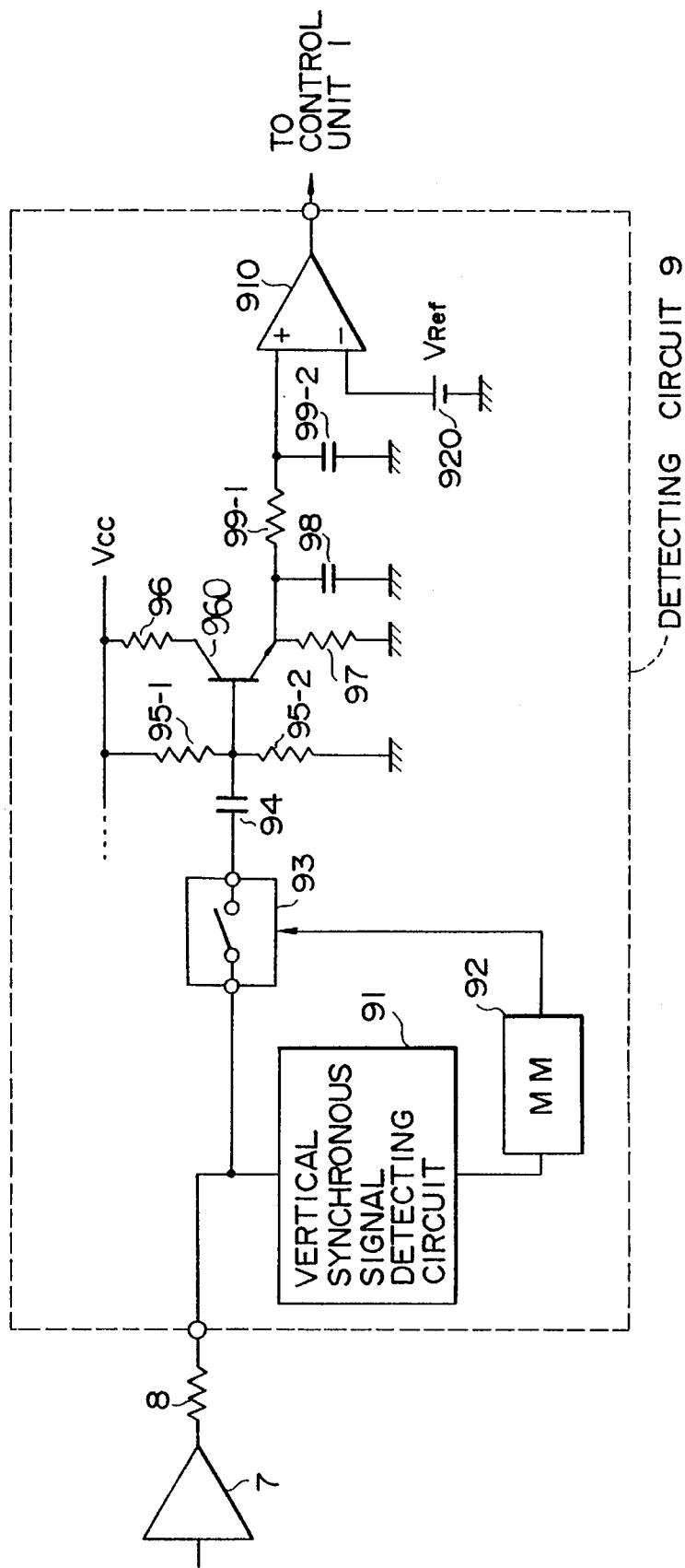
FIG. 1B shows a circuit diagram of a detecting circuit which is employable in a data reproducing device shown in FIG. 1A.
Figure 1C:
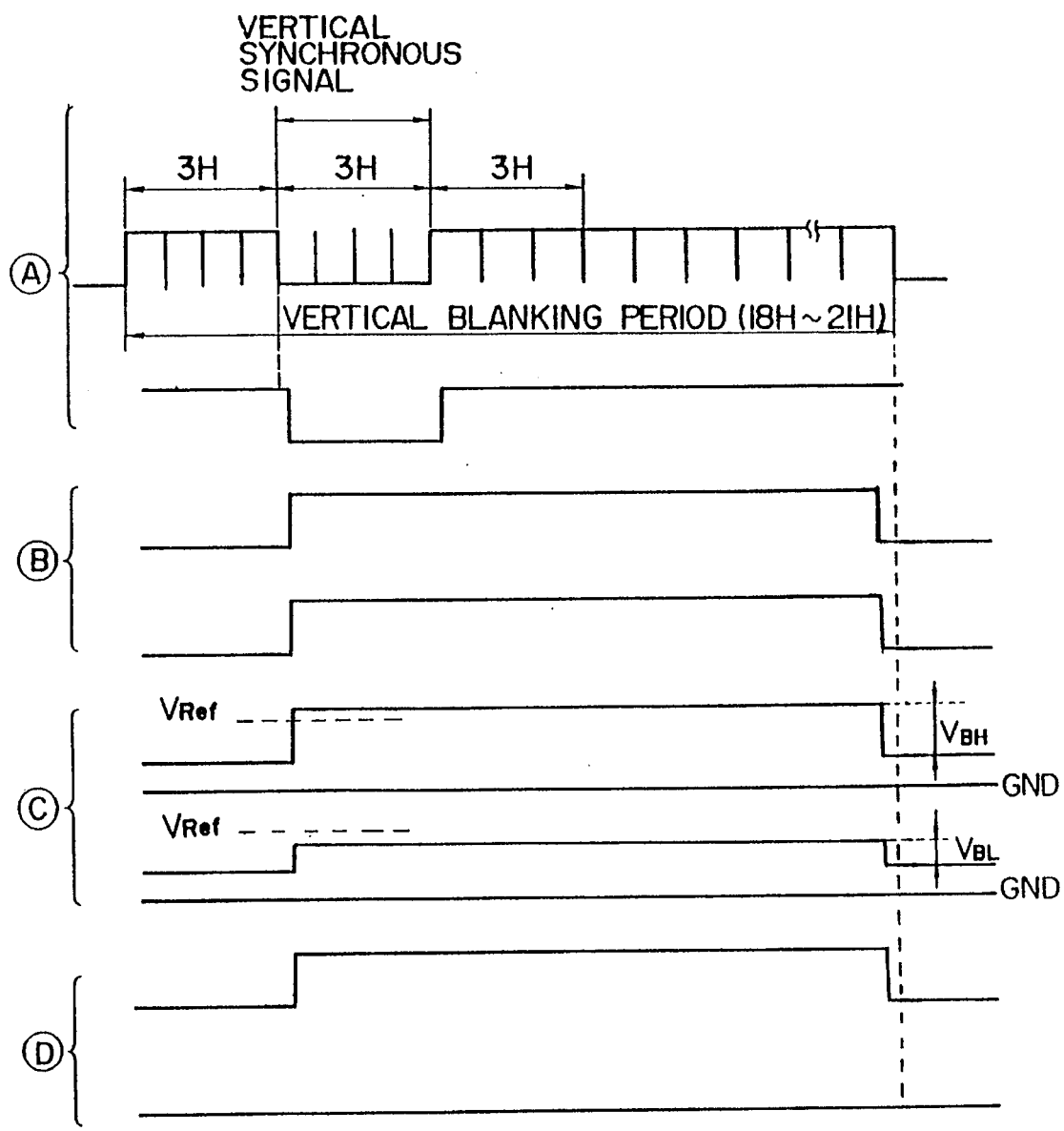
FIG. 1C shows a timing chart showing an operation of the detecting circuit of FIG. 1B.

Referring to the drawings of FIGS. 1B and 1C, an arrangement and an operation of the detecting circuit 9 will now be described.

An image signal output from the amplifier circuit 7 is input into the vertical synchronous signal detecting circuit 91 so that the vertical synchronous signal is detected. As shown in "A" of the drawing of FIG. 1C, an image signal corresponding to one vertical blanking period comprises a plurality of (18 through 21) horizontal period units "H", vertical synchronous signal corresponding to a predetermined amount of the horizontal period units (3H, in this drawing) is included at a predetermined position in the vertical blanking period. The image signal other than the vertical synchronous signal includes a plurality of equalizing pulses. A monostable multivibrator 92 is triggered by a falling edge of the vertical synchronous signal having been detected by the vertical synchronous signal detecting circuit 91, and the output signal of the monostable multivibrator 92 is applied to an analog switch 93 as a gate signal thereof. The bottom curve of the drawing "A" of FIG. 1C indicates an input signal of the monostable multivibrator 92. The monostable multivibrator 92 is driven by the vertical synchronous signal after a predetermined delay time caused by the vertical synchronous signal detecting circuit 91. The top curve of the drawing "B" of FIG. 1C indicates the output signal of the monostable multivibrator 92, and the bottom one indicates an input signal of the analog switch. As shown in these curves the analog switch is turned ON after the gate signal is inputted. The ON-operated state of the analog switch continued for a predetermined period which is shorter than the vertical blanking period. In other words, the pulse signals included in the image signals having been outputted from the amplifier circuit 7 are transmitted below the analog switch 93.

The pulse signal from the analog switch 93 is passed through a condenser (capacitor) 94 and inputted into another amplifier circuit including a transistor 960 to which the base bias determined by resistors 95-1 and 95-2 is applied. The transistor 960 is driven by voltage transmitted from the a Vcc line which is connected to an emitter terminal of the transistor 960. Resistor 97 determines the amount of current which flows through the transistor 960. A condenser (capacitor) 98 is charged by the pulse signals which pass through the transistor 960. Further, a ripple component included in the pulse signals is attenuated by a low pass filter comprising a resistor 99-1 and a capacitor 99-2, and the pulse signal is smoothed. In other words, the pulse signal included in the image signal is converted into a D.C. (Direct Current) voltage whose level corresponds to the amplitude of the image signals including the pulse signals. The D.C. voltage is inputted into one of the input terminals of a comparator 910. The drawing "C" of FIG. 1C indicates the D.C. voltage obtained at a terminal of the condenser 99-2. The top chart indicates the case in which the monitor is not operable, while the bottom chart indicates that the monitor is operable. As described above, the amplitude of the image signals (voltages) under the condition that the monitor is operable is attenuated. Accordingly, when the monitor is not operable, the high level voltage Vbh is obtained as indicated in the top chart. On the contrary, when the monitor is operable, the Vbl less than Vbh is obtained. This voltage is then input to the comparator 910.

The drawing "D" indicates the output signals outputted from the comparator 910. The other input terminal of the comparator 910 is connected to a predetermined power source 920 having a constant voltage Vref. The voltage values inputted through each of the input terminals are compared, and then, an "H" (High) level or "L" (Low) level voltage is output by the comparator 910. The top chart of the drawing "D" of FIG. 1C indicates the case in which the Vbh is obtained at the condenser 99-2, while the bottom chart of thereof indicates the case in which the Vbl is obtained. In other words, either an "H" level or "L" level voltage is outputted in accordance with the obtained voltage. By determining the value of Vref as well as the characteristics of the obtained voltage at the condenser 99-2 in accordance with the state of the monitor, it becomes possible to output an "H" level voltage whenever the monitor is not operable.

The control unit 1 controls the driving mechanism 4, so as not to be driven when an "H" level is outputted from the comparator 910, by means of a well-known switching circuit (not shown) comprising, for example, a switching transistor circuit.

As described above, if it is determined that the devices are not operably connected in step S4, the control unit 1 controls the driving mechanism 4 and the reproducing circuit 6 so as to be stopped in step S6. Thus the reproducing operation is stopped. It is possible to indicate a predetermined alarming, as shown in step S4-1, in case that it is judged that the devices are not operably connected in step S4. By the predetermined alarming, an operator can make the devices operable. If the devices are operably connected, the reproducing operations are repeated in step S5-1 until operation of a stop switch in step S5, not shown, which may be provided on the operation panel 2.

Figure 3:
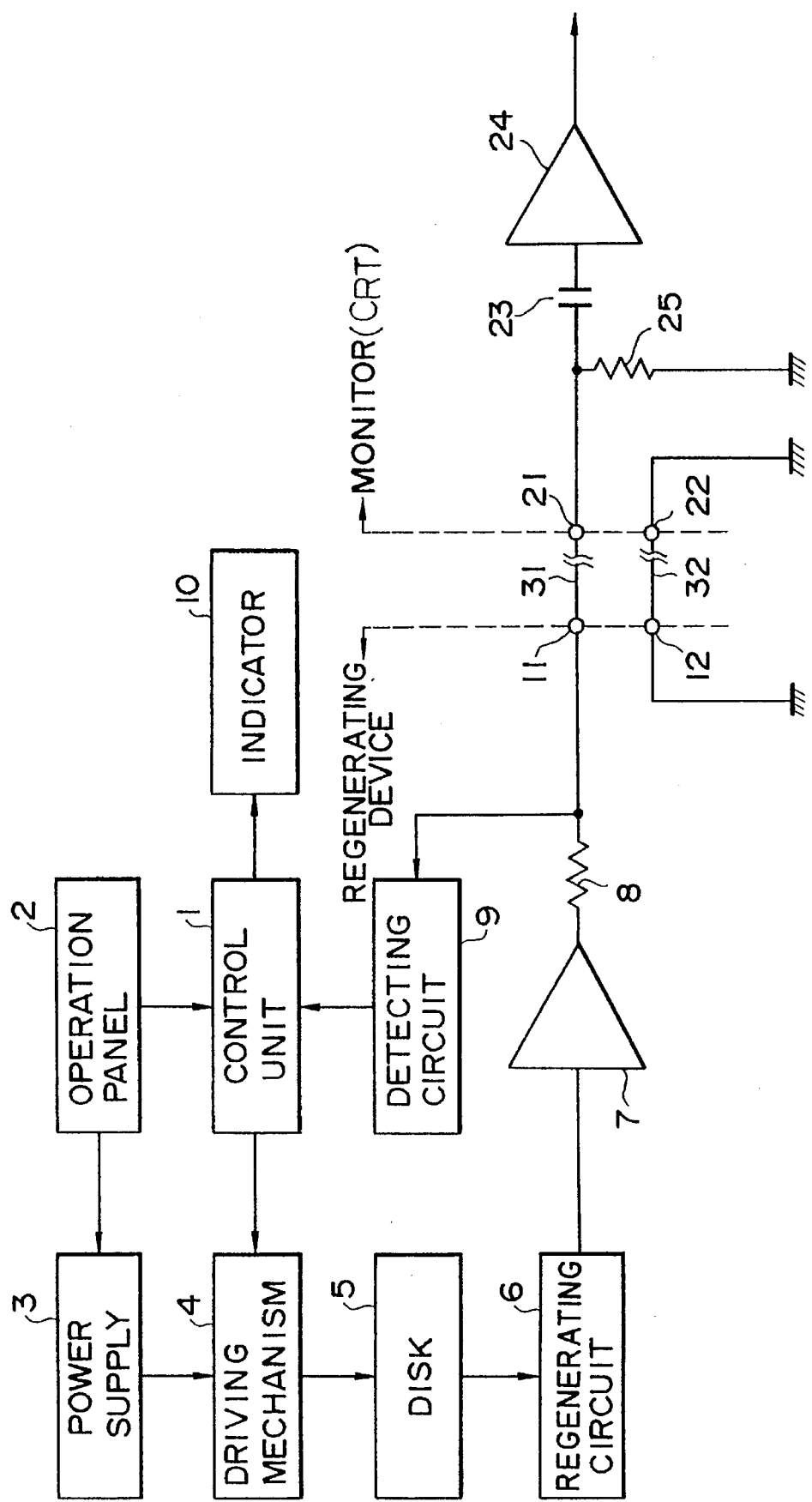
FIG. 3 shows a block diagram showing another embodiment of a data reproducing device according to the present invention.

FIG. 3 shows a block diagram showing another embodiment of a data reproducing device according to the present invention. In this embodiment, the transistor 26 and the terminal detecting circuit 27 of the first embodiment as shown in FIG. 1 are not provided on the monitor device and the input terminal 21 is grounded through the resistor 25. Accordingly, it is not possible to detect the attenuation of the amplitude of the signal to be outputted from the output terminal 11 when the input terminal 21 is selected. However, it is possible to detect, at least, that the data reproducing device and the monitor device are operably connected with each other. Therefore, it becomes possible to stop the reproducing operation in case that the monitor device is not operably connected to the data reproducing device. It can be arranged in such a manner that a connection line for transmitting data relating to an operability of the reproducing operation is provided between the devices. However, in this arrangement, the structure of the devices becomes complex, and the monitor device which is employable in the data reproducing device may be limited.

As described above, in the data reproducing device according to the present invention, it is possible to judge whether the monitor device is operable for representing the data stored in a recording medium adapted to the data reproducing device in accordance with a state of the output terminal from which the data are transmitted toward the monitor device. Therefore, it becomes possible to inhibit reproducing operation in case that it is judged that the monitor device is not operable. Moreover, electrical power required for operating the data reproducing device is not undesirably spent, and a reproducing head provided within the data reproducing device and the video floppy disk are not undesirably worn away.

What is claimed is:

1. A data reproducing device providing a connection to an external device, said data reproducing device reproducing data which is stored in a recording medium coupled to said data reproducing device in a predetermined manner, said data reproducing device comprising at least one terminal for allowing transmission of reproduced data at a predetermined voltage by said data reproducing device, to said external device, said data reproducing device further comprising:

judging means, coupled to said at least one terminal, for judging, based upon a voltage value of said reproduced data being attenuated from said predetermined voltage at said at least one terminal, whether said external device is able to receive the reproduced data; and inhibiting means for inhibiting the transmission of the reproduced data when said judging means judges that said external device is not able to receive the reproduced data.

2. The data reproducing device according to claim 1, wherein said recording medium comprises a video floppy disk arranged to be rotated to allow reading of stored data, and wherein the transmission of the reproduced data is inhibited by inhibiting a data reading operation for reading data from said video floppy disk.

3. The data reproducing device according to claim 1, wherein said judging means comprise a generating circuit for generating a direct current voltage value which is representative of a predetermined component of a signal to be transmitted to said external device, a conversion circuit for converting the generated direct current voltage into a converted voltage having one of first and second voltage values, and a comparing circuit for comparing the converted voltage with a reference voltage value.

4. The data reproducing device according to claim 3, wherein said generating circuit comprises a filter circuit for passing electric currents corresponding to said predetermined component.

5. The data reproducing device according to claim 4, wherein said filter circuit comprises at least a switching member for passing electric currents corresponding to said predetermined component, and wherein said comparing circuit comprises a comparator whose input terminals are arranged so as to receive said converted voltage and said reference voltage value.

6. A data reproducing device providing a connection to an external device, said data reproducing device reproducing data which has been stored in a recording medium arranged to be adapted to said data reproducing device in a predetermined manner, said external device having a plurality of selectable input terminals, reproduced data being input at a predetermined voltage to said external device through a predetermined one of said input terminals, said data reproducing device further comprising:

judging means for judging, based on a value of voltage of said reproduced data being attenuated from said predetermined voltage at said predetermined one of said input terminals, whether said external device is able to receive the data; and inhibiting means for inhibiting a predetermined data processing for the data reproducing operation when it is judged by said judging means that said external device is not able to receive the data.

7. The data reproducing device according to claim 6, wherein said recording medium comprises a video floppy disk arranged to be rotated to allow reading of the data, and wherein said predetermined data processing comprises a data reading operation for reading data from said video floppy disk.

8. The data reproducing device according to claim 7, wherein said judging means comprises changing means for changing an amplitude of a predetermined signal to be transmitted to said external device when said external device is not able to receive the data, and detecting means for detecting the change of the amplitude of said predetermined signal.

9. The data reproducing device according to claim 8, wherein said changing means increase the amplitude of said predetermined signal when said external device is not able to receive the data.

10. The data reproducing device according to claim 9, wherein said changing means comprises an electrical circuit for coupling a communication line through which said predetermined signal is transmitted to ground when said external device is able to receive the data.

11. The data reproducing device according to claim 10, wherein said data reproducing device further comprises select means for selecting said predetermined one of said input terminals through which the data is to be input, and further wherein said electrical circuit comprises a transistor connected to said communication line and arranged to be turned ON when said predetermined one of said input terminals is selected by said select means, whereby the amplitude of said predetermined signal is attenuated only when the external device is able to receive the data.

12. The data reproducing device according to claim 8, wherein said detecting means comprise a filter circuit for passing a predetermined component of said predetermined signal and a conversion circuit for converting the predetermined component into one of first and second voltage values.

13. The data reproducing device according to claim 12, wherein said filter circuit comprises at least a switching member for passing electric currents corresponding to said predetermined component, and wherein said conversion circuit comprises a comparator whose input terminals are arranged to receive voltage values representative of the predetermined component, and a predetermined reference voltage value.

14. A data communication system comprising a data transmitting unit and a data receiving unit connected with each other by means of communication lines, said data transmitting and receiving units respectively executing data processing, said data transmitting unit transmitting reproduced data at a predetermined voltage to said data receiving unit via at least one of said communication lines, said data communication system further comprising:

judging means for judging, based on a value of voltage of said reproduced data being attenuated from said predetermined voltage at said at least one of said communication lines, whether said data receiving unit can receive the data transmitted from said data transmitting unit; and inhibiting means for inhibiting the processing to be executed in said data transmitting unit when it is judged by said judging means that said data receiving unit cannot receive the data.

15. The data communication system according to claim 14, wherein the processing to be inhibited by said inhibiting means comprises an operation performed on the data to be transmitted to said data receiving unit.

16. A data reproducing apparatus having a data reproducing device for reproducing data and transmitting said reproduced data at a predetermined voltage to an external device, said data reproducing device comprising:

means for reproducing said data;

a data transmitting terminal having a first and second electrical conditions;

means for discriminating whether said terminal is in the first electrical condition based on said predetermined voltage of said reproduced data detected at said terminal;

means for inhibiting data reproduction by said data reproducing means when said data transmitting terminal is in the first electrical condition; and means for transmitting said reproduced data over said data transmitting terminal.

17. The data reproducing apparatus according to claim 16, wherein the first and second electrical conditions comprise conditions in which a voltage value present at said data transmitting terminal is high and low, respectively.

18. The data reproducing apparatus according to claim 16, said apparatus further comprising the external device, the external device comprising means for attenuating said data to produce attenuated data when the external device can accept said data.

19. A data reproducing device providing a connection to an external device, said data reproducing device reproducing data which is stored in a recording medium coupled to said data reproducing device in a predetermined manner, said data reproducing device comprising at least one terminal for allowing transmission of data reproduced by said data reproducing device, to said external device, said data reproducing device further comprising:

judging means for judging whether said external device is connected based upon a voltage value of the reproduced data present at said at least one terminal, said voltage value of the reproduced data being low when said external device is connected to said data reproducing device, and said voltage value of the reproduced data being high when said external device is not connected to said data reproducing device; and inhibiting means for inhibiting the transmission of the reproduced data when said judging means judges that said external device is not connected to said data reproducing device.

20. A data reproducing device providing a connection to an external device, said data reproducing device reproducing data which has been stored in a recording medium coupled to said data reproducing device in a predetermined manner, said external device having a plurality of selectable input terminals, the data being input to said external device through a predetermined one of said input terminals, said data reproducing device further comprising:

judging means for judging whether said external device is connected based on a value of voltage of the reproduced data present at said predetermined one of said input terminals, said voltage value of the reproduced data being low when said external device is connected to said data reproducing device, and voltage value of the reproduced data being high when said external device is not connected to said data reproducing device; and inhibiting means for inhibiting a predetermined data processing for the data reproducing operation when said judging means judges that said external device is not connected to said data reproducing device.

21. A data communication system comprising a data transmitting unit connected to a data receiving unit by communication lines, said data transmitting and receiving units respectively executing data processing, said data transmitting unit transmitting data to said data receiving unit via at least one of said communication lines, said data communication system further comprising:

judging means for judging whether said data receiving device is connected based on a value of voltage of the reproduced data present at said at least one of said communication lines, said voltage value of the reproduced data being low when said data receiving unit is connected to said data transmitting unit, and said voltage value of said reproduced data being high when said data receiving unit is not connected to said data transmitting unit; and inhibiting means for inhibiting the processing in said data transmitting unit when said judging means judges that said data receiving unit is not connected to said data transmitting unit.

22. A data reproducing apparatus having a data reproducing device for reproducing data and transmitting said reproduced data to an external device, said data reproducing device comprising:

means for reproducing said data;

a data transmitting terminal having a first and second electrical conditions;

means for discriminating whether said terminal is in the first electrical condition based on a voltage value of said reproduced data detected at said terminal;

means for inhibiting data reproduction by said data reproducing means when said data transmitting terminal is in the first electrical condition; and means for transmitting said reproduced data over said data transmitting terminal.

\* \* \* \* \*